US007623455B2

(12) United States Patent
Hilla et al.

(10) Patent No.: US 7,623,455 B2
(45) Date of Patent: Nov. 24, 2009

(54) METHOD AND APPARATUS FOR DYNAMIC LOAD BALANCING OVER A NETWORK LINK BUNDLE

(75) Inventors: Stephen Hilla, Raleigh, NC (US); Kenneth H. Potter, Raleigh, NC (US); John Marshall, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 817 days.

(21) Appl. No.: 11/097,798

(22) Filed: Apr. 2, 2005

(65) Prior Publication Data
US 2006/0221974 A1 Oct. 5, 2006

(51) Int. Cl.
*H04L 12/28* (2006.01)
*G06F 3/00* (2006.01)

(52) U.S. Cl. ............... 370/232; 370/235; 370/412; 718/105; 710/53

(58) Field of Classification Search ......... 370/229–232, 370/235, 236, 237, 238, 412, 419; 718/105; 710/36, 52, 53, 57
See application file for complete search history.

(56) References Cited

U.S. PATENT DOCUMENTS

| | | | |
|---|---|---|---|
| 5,414,704 A | 5/1995 | Spinney | |
| 5,506,987 A | 4/1996 | Abramson et al. | |
| 5,872,773 A | 2/1999 | Katzela et al. | |
| 5,892,903 A | 4/1999 | Klaus | |
| 5,950,205 A | 9/1999 | Aviani, Jr. | |
| 5,953,335 A | 9/1999 | Erimli et al. | |
| 5,959,968 A | 9/1999 | Chin et al. | |
| 5,989,060 A | 11/1999 | Coile et al. | |
| 6,006,266 A | 12/1999 | Murphy et al. | |
| 6,016,388 A | 1/2000 | Dillon | |
| 6,052,718 A | 4/2000 | Gifford | |
| 6,094,683 A | 7/2000 | Drottar et al. | |
| 6,160,808 A | 12/2000 | Maurya | |
| 6,345,294 B1 | 2/2002 | O'Toole et al. | |
| 6,456,590 B1 * | 9/2002 | Ren et al. | 370/229 |
| 6,473,424 B1 | 10/2002 | DeJager et al. | |
| 6,505,254 B1 | 1/2003 | Johnson | |
| 6,549,540 B1 | 4/2003 | Ward | |
| 6,667,975 B1 | 12/2003 | DeJager et al. | |

(Continued)

FOREIGN PATENT DOCUMENTS

WO    WO98/31107    7/1998

OTHER PUBLICATIONS

Eager et al, "Adaptive Load Sharing in Homogeneous Distributed Systems", IEEE Transactions on Software Engineering, vol. SE-12, No. 5, May 1986.

(Continued)

*Primary Examiner*—Aung S Moe
*Assistant Examiner*—Kerri M Rose
(74) *Attorney, Agent, or Firm*—Stolowitz Ford Cowger LLP

(57) ABSTRACT

Techniques for distributing data packets over a network link bundle include storing an output data packet in a data flow queue based on a flow identification associated with the output data packet. The flow identification indicates a set of one or more data packets, including the output data packet, which are to be sent in the same sequence as received. State data is also received. The state data indicates a physical status of a first port of multiple active egress ports that are connected to a corresponding bundle of communication links with one particular network device. A particular data flow queue is determined based at least in part on the state data. A next data packet is directed from the particular data flow queue to a second port of the active egress ports. These techniques allow a more efficient use of a network link bundle.

16 Claims, 8 Drawing Sheets

U.S. PATENT DOCUMENTS

| | | | |
|---|---|---|---|
| 6,687,840 B1 | 2/2004 | Drottar et al. | |
| 6,952,401 B1 * | 10/2005 | Kadambi et al. | 370/232 |
| 7,042,891 B2 * | 5/2006 | Oberman et al. | 370/412 |
| 7,117,273 B1 | 10/2006 | O'Toole et al. | |
| 7,130,824 B1 * | 10/2006 | Amanat et al. | 705/37 |
| 7,149,771 B1 | 12/2006 | Gifford | |
| 7,171,491 B1 | 1/2007 | O'Toole et al. | |
| 7,185,077 B1 | 2/2007 | O'Toole et al. | |
| 7,281,036 B1 | 10/2007 | Gang | |
| 7,310,332 B2 * | 12/2007 | Kadambi et al. | 370/360 |
| 7,349,348 B1 | 3/2008 | Johnson | |
| 2002/0141427 A1 * | 10/2002 | McAlpine | 370/413 |
| 2006/0218301 A1 | 9/2006 | O'Toole et al. | |
| 2007/0266125 A1 | 11/2007 | Lu et al. | |
| 2007/0299942 A1 | 12/2007 | Lu et al. | |

OTHER PUBLICATIONS

Internap, "Preferred Collocation Services," http://www.internap.com Copyright © 2001 Internap Network Services Corporation.

Meyer, et al. Request For Comments No. 2026, entitled, "Generic Routing Encapsulation (GRE)," Jan. 2000, Internet Engineering Task Force, 9 pages.

Mockpetris, P., Request for Comments No. 1034, entitled, "Domain Names- Concepts and Faciliteis," Nov. 1987, Internet Engineering Task Force, 31 pages.

Information Sciences Institute, Request for Comments No. 793, entitled "Transmission Control Protocol- DARPA Internet Program- Protocol Specification," Sep. 1981, Internet Engineering Task Force, 49 pages.

Cable Television Laboratories, Inc., Interim Specification, "Data-Over-Cable Service Interface Specifications, Radio Frequency Interface Specification, SP-RFIv1.1-102-990731," Jul. 30, 1999, 352 Pages.

Digital Island, Inc.-e-Business Without Limits-, "Enabling Technologies," http://www.digisle.net. No date.

Stolowtiz Ford Cowger LLP, Listing of Related Cases, Aug. 18, 2009.

* cited by examiner

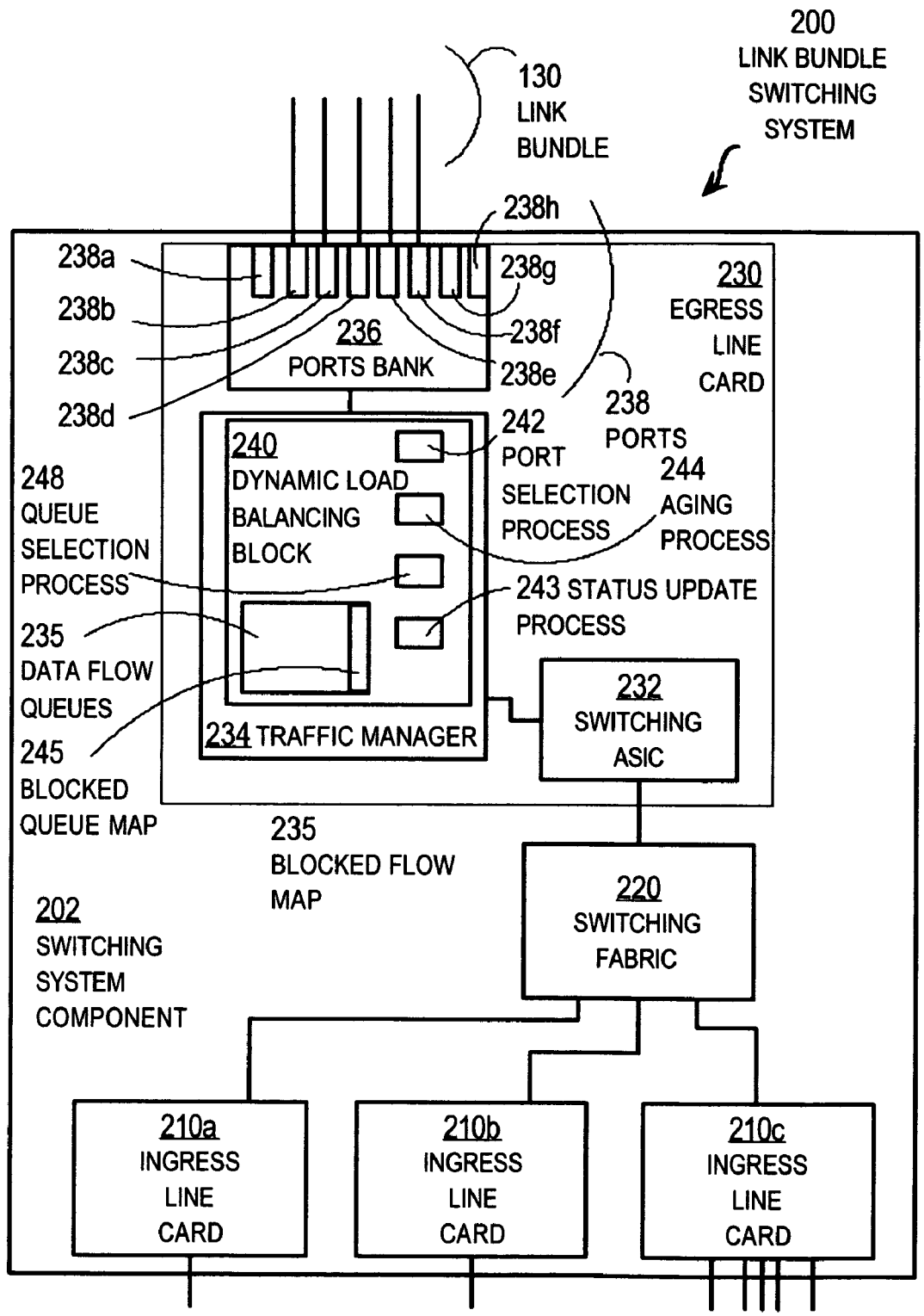

FIG. 3B

300 EGRESS LINE CARD MEMORY

302 MEMORY

340 PORT BUFFERS
- 340a
- 340b
- 340c
- 340d
- 340e
- 343
- 345

344 FLOW CONTROL STATUS TABLE — 342 FLOW CONTROL STATUS RECORDS
- 342a, 342b, 342c, 342d, 342e

350 MAPPING TABLE

| 354a FLOW ID | 356a PORT # | 358a AGE |
|---|---|---|
| 354b FLOW ID | 356b PORT # | 358b AGE |

352a RECORD
352b RECORD
353 • • •

235 DATA FLOW QUEUES

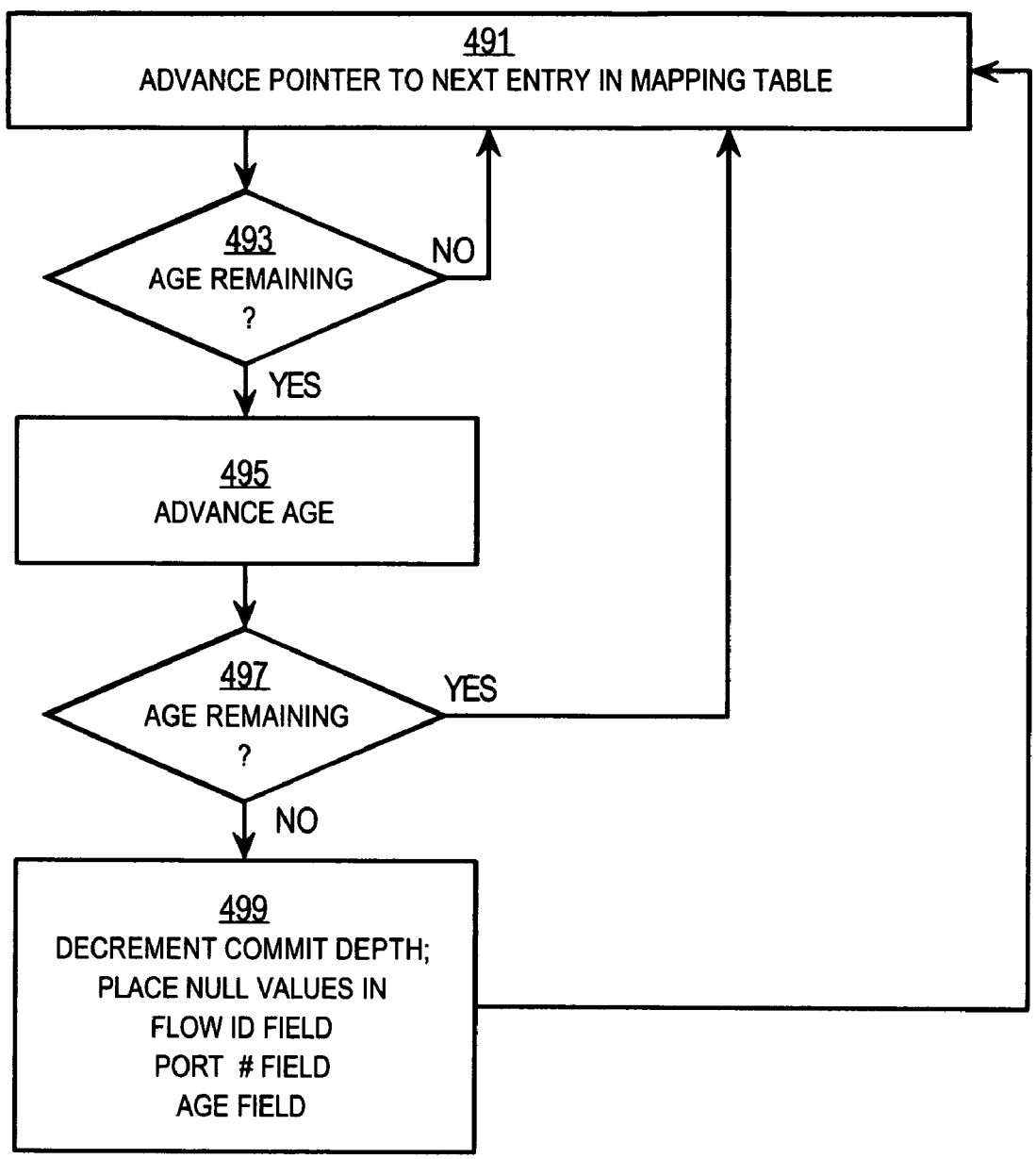

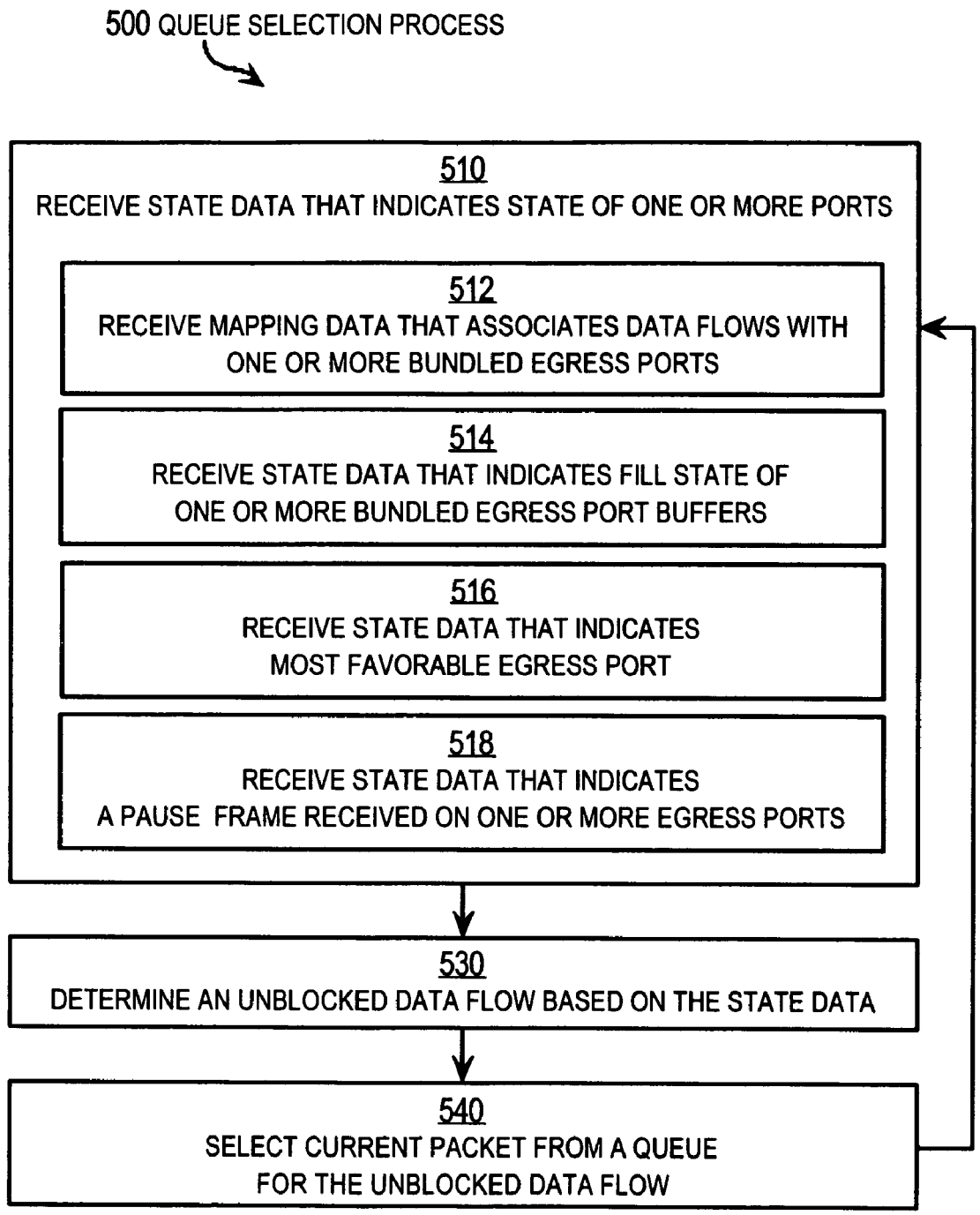

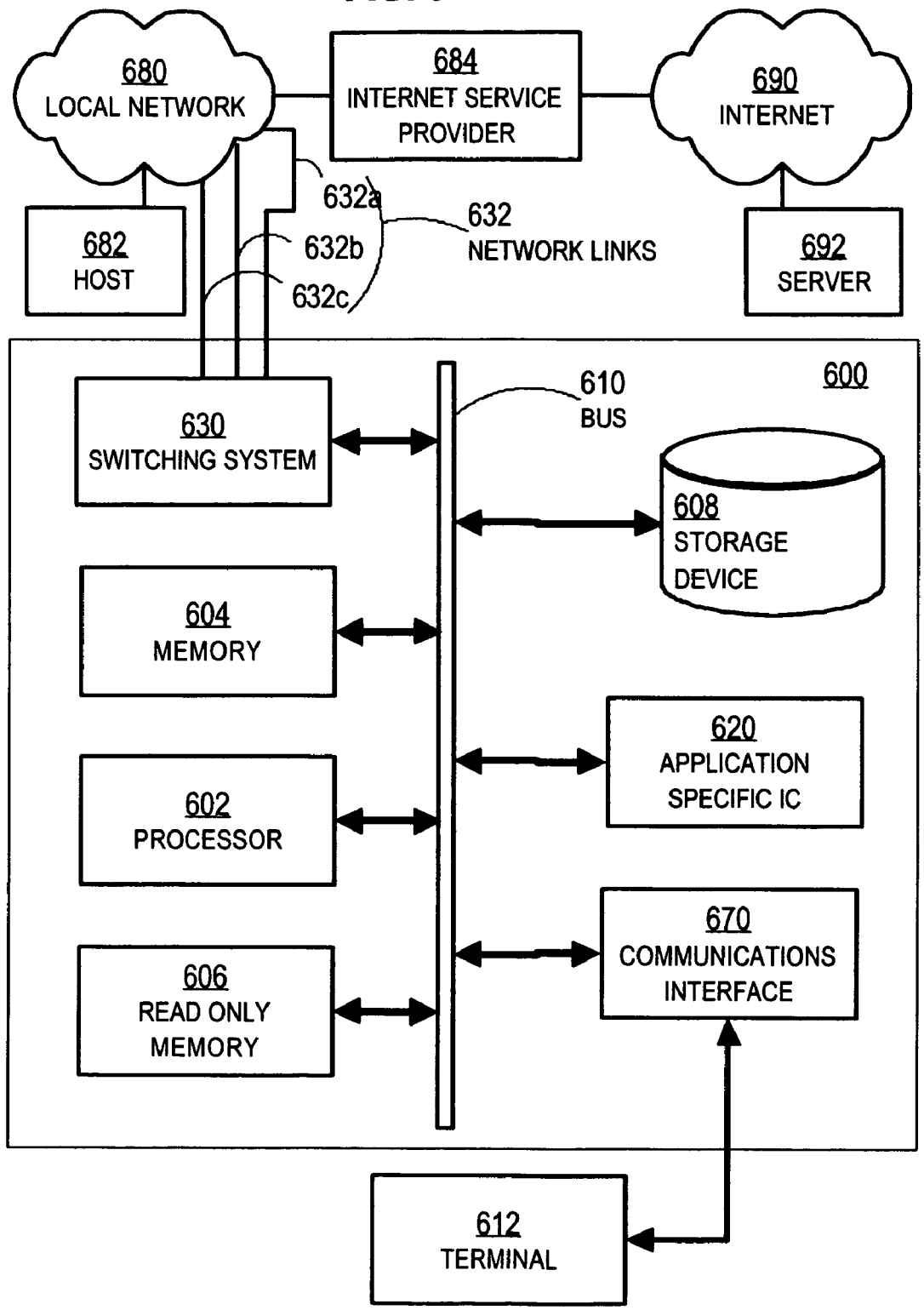

METHOD AND APPARATUS FOR DYNAMIC LOAD BALANCING OVER A NETWORK LINK BUNDLE

BACKGROUND OF THE INVENTION

1. Field of the Invention

The present invention relates to networks with bundles of communication links between at least one pair of network devices, as in the core infrastructure of a large enterprise or service provider network; and, in particular, to apportioning a stream of data packets among the bundle of communication links based on physical state of the ports connected to the bundle.

2. Description of the Related Art

Networks of general purpose computer systems connected by external communication links are well known and widely used in commerce. The networks often include one or more network devices that facilitate the passage of information between the computer systems. A network node is a network device or computer system connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information to be processed, often independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

Some protocols span the layers of the OSI Reference Model. For example, the Ethernet local area network (LAN) protocol includes both layer 1 and layer 2 information. The International Electrical and Electronics Engineers (IEEE) 802.3 protocol, an implementation of the Ethernet protocol, includes layer 1 information and some layer 2 information.

Routers and switches are network devices that determine which communication link or links to employ to support the progress of packets through the network. For example, Ethernet switches forward packets according to the Ethernet protocol. Some current routers implement sophisticated algorithms that provide high performance forwarding of packets based on combining layer 2 and layer 3 header information, or some other combination. For example, instead of making forwarding decisions separately on each packet in a stream of related packets (called a "packet flow" or simply a "flow"), such as a stream directed from the same source node to the same destination node, these routers identify the packet flow from a unique signature derived from the layer 2 or layer 3 header information and forward each member of the flow according to the same decision made for the first packet in the flow.

The number of bits that are carried over a communication link in a unit time is called the speed or bandwidth of the communication link. The bandwidth of a particular link is limited by the physical characteristics of the cable and the port on each network node to which the cable is connected. As used here, a port is a physical interface on a network device that is, or can be, connected to a cable to serve as a communication link with a port on another network device. For example, three types of widely used Ethernet links have three different bandwidths of 100 Megabits per second (Mbps, where 1 Megabit=$10^6$ binary digits called bits), 1 Gigabit per second (Gbps, where 1 Gigabit=$10^9$ bits), or 10 Gbps. These three bandwidths are termed Fast Ethernet, Gigabit Ethernet and 10 Gigabit Ethernet, respectively.

In some circumstances, the bandwidth needed between two nodes does not match one of the readily available bandwidths. In such circumstances, some networks bundle multiple communication links between a pair of network nodes. For example, if network traffic between a particular server and an Ethernet switch in an office building needs bandwidth up to 500 Mbps, then it might be more cost-effective to connect five Fast Ethernet ports on each device rather than to install a Gigabit Ethernet port on each device and string a Gigabit cable in the walls between them. The five Fast Ethernet links in this example constitute a bundle of communication links. Similarly, if network traffic needs exceed 10 Gbps, then these needs can be met with a bundle of two or more 10 Gigabit Ethernet communication links. Link Aggregation Control Protocol (LACP) is part of an IEEE specification (802.3ad) that allows several physical ports to be bundled together to form a single logical channel. LACP allows a switch to negotiate an automatic bundle by sending LACP packets to the peer.

Bundled communication links are commercially available. For example bundled Ethernet links are available from Cisco Systems, Inc. of San Jose, Calif. as ETHERCHANNEL™ capabilities on Ethernet switches and routers. Bundled links are also available on routers for use with a Synchronous Optical Network (SONET) for optical communication links as part of packet over SONET (POS) technology from Cisco Systems.

A load-balancing process is used on the sending network node of the pair connected by a bundle of communication links for the purpose of determining which communication link to use for sending one or more data packets to the receiving network node of the pair. Current balancing algorithms use a fixed mapping to associate data packets with a specific port in a set of ports connected to the communication links in the bundle. Typically, information in a header portion of a data packet is used to derive a value that is associated with one port of the set. The algorithm is designed to generate a value in a range of values that are associated with the full set of ports. Thus data packets directed to the receiving node are distributed over all communication links in the bundle by the load balancing process. Many load-balancing processes are designed so that all data packets in the same data flow are sent through the same port.

While suitable for many purposes, fixed-mapping load balancing suffers some deficiencies that result in poor utilization of the entire bandwidth available on a bundle of communication links.

Typically, the fixed-mapping takes several bits from one or more fields in layer 2 or layer 3 headers, or both, and inputs those bits to a hash function that produces an output with a certain number of bits. The output is then used directly or indirectly to select a port among the set connected to the bundle of communication links. By judicious choice of the fields, data packets from the same flow may be mapped to the same port.

For example, if there are eight communication links in a bundle, some fixed-mapping load-balancing processes map different data packets to one of eight values, such as by using a hash function with a three-bit output. Three bits represent eight different values (0 to 7) which are associated with the eight different ports in the set connected to the eight communication links. While such an approach may cause data packets with similar values in their layer 2 and layer 3 headers to be directed to different ports of the set, there is no guarantee that the process will distribute traffic uniformly across the set of ports. For example, a disproportionate number of data packets might be mapped to the value 5. Thus some ports may still become overused, causing a reduction in the effective bandwidth.

In some approaches, the fixed-mapping is adjusted to accommodate different bundle sizes. For example, if bundle sizes are allowed to vary from two to eight communication links per bundle, some fixed-mapping load-balancing processes map different data packets to one of eight values, such as by using a hash function with a three-bit output, as described above, to accommodate the largest bundle. In smaller bundles, the 8 possible output values are then mapped to the three active communication links. For example, output values 0,3,6 are mapped to the first port, values 1,4,7 are mapped to the second port, and values 2,5 are mapped to the third port. Because there are three values mapped to the first two ports compared to two values mapped to the third port, the third port will be underutilized compared to the first two. The underutilization of the third port occurs even if the distribution of the original eight values is uniform.

Even if the mapping of data flows to ports is uniform, underutilization of a bundle can occur. For example, consider the situation in which two packet flows include 10,000 data packets and 10 other packet flows each include 100 packets, all packets of the same size. If there are three communication links in the bundle, then the fixed-mapping process is likely to send four packet flows to each of the three ports connected to corresponding communication links in the bundle. Two of the three ports might carry 10,300 data packets, the third will carry 400 data packets. The first two ports might become overused even while the third port is underused, leading to a reduction in the rate at which the 10,300 data packets are sent over the first and second communication links. The bundle as a whole performs at a rate less than its advertised capability. The situation could be even worse if both large data flows are sent over the same port; then as many as 20,200 packets are sent over the first port while the second and third ports carry only 400 packets each. It would likely be preferable to send one flow of 10,000 data packets over each of the first two ports and ten flows totaling 1,000 data packets over the third port.

There are disadvantages in approaches to distribute data packets from the same packet flow on different communication links of a bundle. A major problem arises because variable delays are experienced on every communication link, caused for example by congestion, noise and errors. If successive data packets from the same flow are placed on different links, the later packet might experience a smaller delay than the earlier packet and arrive at the destination node out of order. Out-of-order data packets create problems for the receiving node. For example, in some protocols, out-of-order data packets cause a receiving node to determine that there is missing data, and the receiving node may add to congestion on the link by sending requests on the link to resend several data packets and then receiving the resent data packets on that link. In some protocols, out of order packets are simply discarded.

Another problem that occurs with fixed mapping is hash polarization. As several intermediate network nodes use the same hash function in the fixed mapping, the output hash values tend to bunch on the same value. Among other factors, this occurs because once two flows have hashed to the same value, they will arrive at the next network node on the same link and tend to be grouped with the same flow ID. Thus, once joined the two flows will not separate.

In general, fixed-mapping load balancing can result in non-uniform distribution of data packets across the bundle of communication links, and thus result in performance below the full capacity of the bundle.

In a more recent approach, load balancing selects a port based on the degree to which buffers that hold data being sent out on each port are filled. A data packet from a new flow is directed to a port that has a buffer that is not full. While this approach tends to distribute data packets from new flows to ports more able to handle the new flows, it experiences some problems. For example, if a long sequence of data packets from the same flow are directed to the ports, they are all directed to the same port to preserve sequence order. The port receiving the data packets from this flow can become full. The next data packet from that flow cannot be placed until the port buffer fill level drops. Data transmission on the entire bundle halts until that next data packet can be placed in its target port buffer. The bundle thus does not perform at advertised capacity.

Based on the foregoing, there is a clear need for a load-balancing process for bundles of communication links that does not suffer all the deficiencies of the prior art approaches. In particular, there is a need for a dynamic load-balancing process that distributes data packets among a bundle of communication links based on the actual utilization of those links other than fill level. There is also a need for a dynamic load-balancing process that selects data packets from different packet flows so that a data flow directed to a filled port does not overly limit capacity of the bundle.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates a link-bundle switching system in a router, according to an embodiment;

FIG. 3B is a block diagram that illustrates data structures in a memory for an egress line card, according to an embodiment;

FIG. 4B is a flow diagram that illustrates a separate background aging process, according to an embodiment;

FIG. 5 is a flow diagram that illustrates a queue selection process, according to an embodiment; and FIG. 6 is a block diagram that illustrates a router upon which an embodiment of the invention may be implemented.

DETAILED DESCRIPTION

A method and apparatus are described for dynamic balancing of data packet traffic loads over a link bundle in a network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The invention is described in the following sections in the context of an Ethernet 802.3ad link bundle between two routers in the core or backbone of an enterprise network, but the invention is not limited to this context. In other embodiments, the link bundle is at a network edge, for example connecting an end node performing as a host for a high-throughput network server process of a client-server application. In other embodiments, different communication links are bundled between two network nodes, such as Packet over SONET (POS), and High-level Data Link Control (HDLC) links, among others.

1.0 Network Overview

Figure 1:
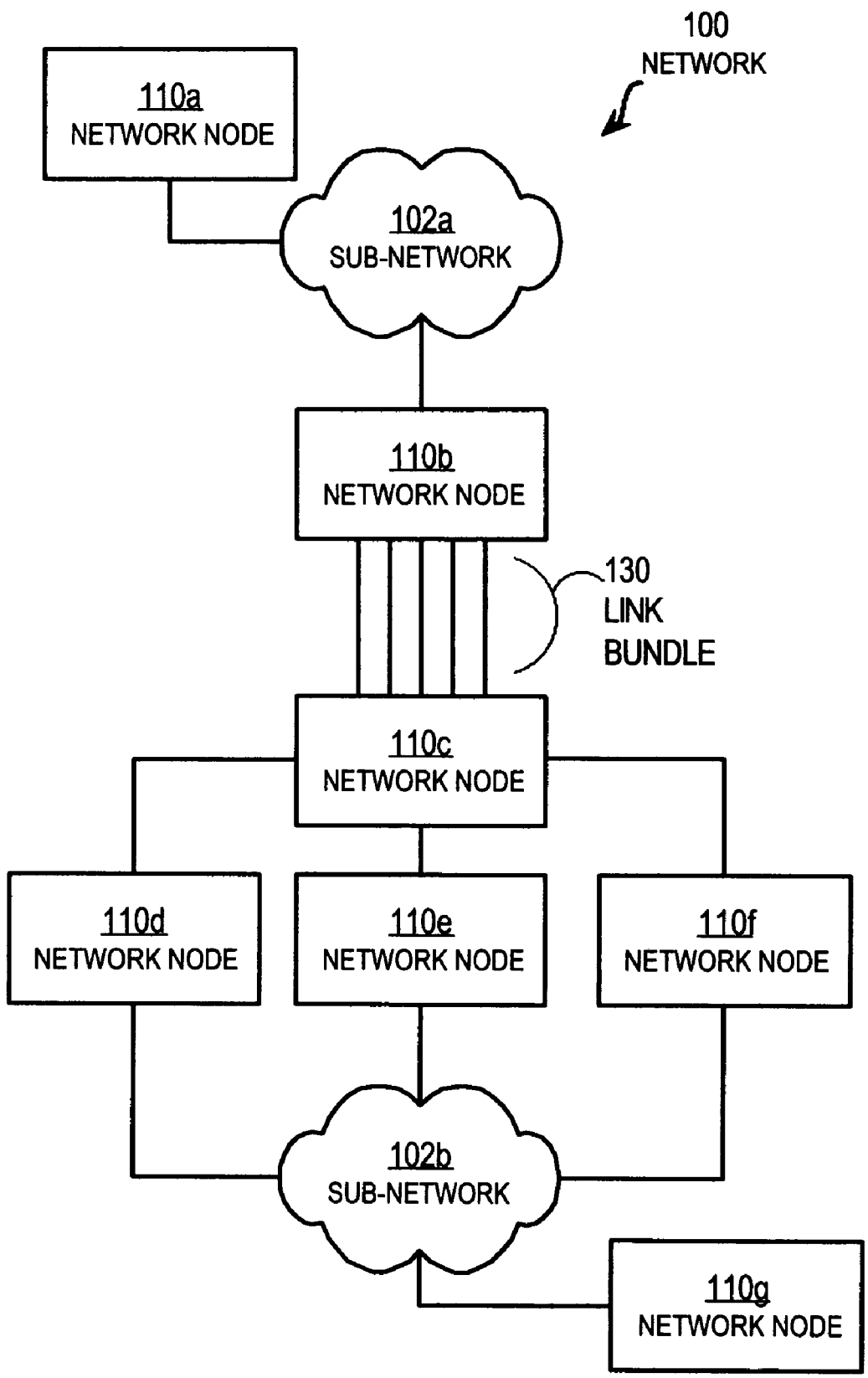
FIG. 1 is a block diagram that illustrates a network with a link bundle, according to an embodiment.

FIG. 1 is a block diagram that illustrates a network with a link bundle, according to an embodiment. A computer network is a geographically distributed collection of interconnected sub-networks (e.g, sub-networks 102a, 102b, collectively referenced hereinafter as sub-networks 102) for transporting data between network nodes (e.g., network nodes 110a, 110b, 110c, 110d, 110e, 110f, 110g, collectively referenced hereinafter as network nodes 110). A local area network (LAN) is an example of such a sub-network 102. The network's topology is defined by an arrangement of end nodes that communicate with one another, typically through one or more intermediate network nodes such as a router or switch, which facilitates routing data between end nodes. As used herein, an end node is a node that is configured to originate or terminate communications over the network. In contrast, an intermediate network node facilitates the passage of data between end nodes. In FIG. 1, the network nodes 110 include both end nodes (e.g., nodes 110a, 110g) and intermediate nodes (e.g., network node 110c). Each sub-network 102 includes zero or more intermediate network nodes.

FIG. 1 illustrates a link bundle 130 that includes five communication links between intermediate network node 110c and network node 110b. Network node 110b may be an intermediate network node or an end node that is connected both to intermediate network node 110c and subnetwork 102a. For purposes of illustration, intermediate network node 110c is connected by a bundle 130 of five communication links to network node 110b and thereby to subnetwork 102a and end node 110a. Similarly, intermediate network node 110c is connected by three unbundled communication links to network nodes 110d, 110e, 110f, respectively, and thence to sub-network 102b and end node 110g. In other embodiments an intermediate network node 110c may be connected to more or fewer network nodes with more or fewer links in each of one or more link bundles as part of a network with the same or more end nodes.

A network topology as illustrated in FIG. 1 is useful in many example scenarios. For example, in one embodiment, network node 110b is an end node host for a high throughput server that responds to data packets from multiple clients on multiple nodes (e.g., node 110g and others, not shown) on subnetwork 102b that arrive at node 110c through intermediate network nodes 110d, 110e, 110f. In another embodiment, network node 110b is a router connected by a 10 Gigabit Ethernet communication link with subnetwork 102a; and network node 110c is a router connected by two Gigabit Ethernet communication links and one 10 Gigabit Ethernet communication links to network nodes 110d, 110e, 110f, respectively, which are expected to send much of their traffic to sub-network 102a. A single Gigabit Ethernet link is not sufficient for expected traffic between nodes 110c and 110b, and a 10 Gigabit Ethernet link is expected to be excessive. Current traffic and reasonable growth of traffic from sub-network 102b to sub-network 102a is expected to be accommodated by a link bundle 130 of five Gigabit Ethernet links.

2.0 Structural Overview

FIG. 2 is a block diagram that illustrates a link-bundle switching system 200 in a router, which can be used as intermediate network node 110c, according to an embodiment. The switching system 200 includes a switching system component 202 connected to communication links, including link bundle 130. The switching system component 202 includes multiple ingress line cards, including cards 210a, 210b, 210c, for receiving inbound data packets, switching fabric component 220, and multiple egress line cards for sending outbound data packets, including egress line card 230 for link bundle 130.

An ingress line card (e.g., 210a) receives a data packet, inspects the appropriate header fields to make a forwarding decision, and forwards the packet toward the egress line card via the switching fabric component 220. The switch fabric component 220 forwards the packet to the appropriate egress line card 230. Multiple ingress line cards can forward traffic toward a single egress line card 230. In this example, the link bundle 130 is capable of transmitting more packets simultaneously because of the increased bandwidth achieved by bundling. Some ingress line cards (e.g., 210c) are connected to a link bundle with multiple communication links. All communication links in the link bundle are considered a single ingress logical link. In the illustrated embodiment, the five communication links connected to ingress line card 210c are connected to network node 110b. The ingress line card 210c handles incoming traffic on the link bundle 130, while the egress line card 230 handles the outbound traffic on the link bundle 130.

The ingress line cards 210 determine an outbound physical or logical link to use to forward the data packet, for example using data in a routing table stored on the router, and sends information to the egress line card associated with the outbound physical or logical link. All communication links in the link bundle 130 are considered a single logical link. Information about data packets to be output on the link bundle 130 is sent to the egress line card 230.

The egress line card 230 includes a switching application specific integrated circuit (ASIC) 232, a traffic manager block 234, a bank 236 of physical ports, at least some of which are connected to the communication links in the link bundle. In the illustrated embodiment, a dynamic load balancing (DLB) block 240 is included in the traffic manager 234. In some embodiments, the switching ASIC 232, traffic manager 234 and ports bank 236 are standard components of conventional egress cards for link bundles, and the DLB block 240 is external to the traffic manager 234.

The switching ASIC performs various standard functions well known in the art, such as retrieving data packet contents from router memory based on information received from the switching fabric 220 and appending a revised header to the beginning of the packet.

The traffic manager block 234 determines whether the traffic is flowing properly down the link bundle, and responds appropriately. For example, the traffic manager block 234 receives a message from the other network node connected to the link bundle 130 to pause, halt or resend the delivery of data packets due to congestion, out of sequence packets, or lost packets. The traffic manager stores data packets in one or more data flow queues 235 based on a packet flow identification.

The ports bank 236 is a bank of ports which includes multiple ports that are treated by a router as a single logical port for purposes of communicating through link bundle 130 as a single logical link. Each communication link in the link bundle 130 is connected to a different port of the ports bank 236. In the illustrated embodiment, ports bank 236 includes eight ports 238a, 238b, 238c, 238d, 238e, 238f, 238g, 238h (collectively referenced hereinafter as ports 238). For purposes of illustration, it is assumed that these eight ports are identified by a three bit code that represents the eight values from 0 through 7 to correspond to ports 238a through 238h, respectively. Each three bit code is called a port number (port #), herein. Only five of the ports (e.g., 238b, 238c, 238d, 238e, 238f, identified by code values 1 through 5, respectively) are connected to communication links of the link bundle 130 in the illustrated embodiment. These are called active ports. The remaining three ports (e.g., 238a, 238g, 238h, identified by code values 0, 6, 7, respectively) are inactive ports. In some embodiments, a port becomes inactive by virtue of a communication link that is attached to the port going down. When a port goes down, it is no longer eligible to send traffic and the link is removed from the route table. In an example embodiment, the hardware described in more detail below would detect the link's inability to forward traffic and dynamically shift traffic over to an active link. Such a hardware shift can occur much faster than waiting for a routing table update.

According to various embodiments, dynamic load balancing (DLB) block 240 selects the next packet from the data flow queues and directs the next data packet to one of the ports 238 in ports bank 236 based on the state of one or more ports 238 in the ports bank 236, or time gaps between packets of the same flow, or both. In the illustrated embodiment, DLB block 240 includes logic for a port selection process 242 (also called an arbiter process), logic for a port status update process 243, logic for an aging process 244, and logic for a queue selection process 248, all of which are described in greater detail in a later section.

The traffic manager 234 has a data bucket, e.g., data flow queues 235 to hold all data flows received by the traffic manager 234 from the switching ASIC 232. Any type of memory may be used for data flow queues. In an example embodiment, the data flow queues 235 are first in first out (FIFO) buffers, well known in the art. The traffic manager 234 stores data packets from the same packet flow in the same data flow queue, and stores multiple packet flows over one or more queues. A large number of queues are included in data flow queues 235 in order to allow most packet flows to be stored in separate queues.

In the illustrated embodiment, the data flow queues 235 include a mapping of blocked data flow queues called a blocked queue map 245. The blocked queue map holds data that indicates whether data packets from a particular queue are directed to a port with a status unsuitable for rapidly placing that packet on the corresponding physical link. The blocked queue map 245 is manipulated by the dynamic load balancing block 240, as described in more detail below. Thus, in the illustrated embodiment, the data flow queues 235 are depicted in the DLB block 240. In other embodiments, the blocked queue map 245 is separate from the data flow queues 235, and the data flow queues are in the traffic manager 234 but external to the DLB block 240.

Figure 3A:
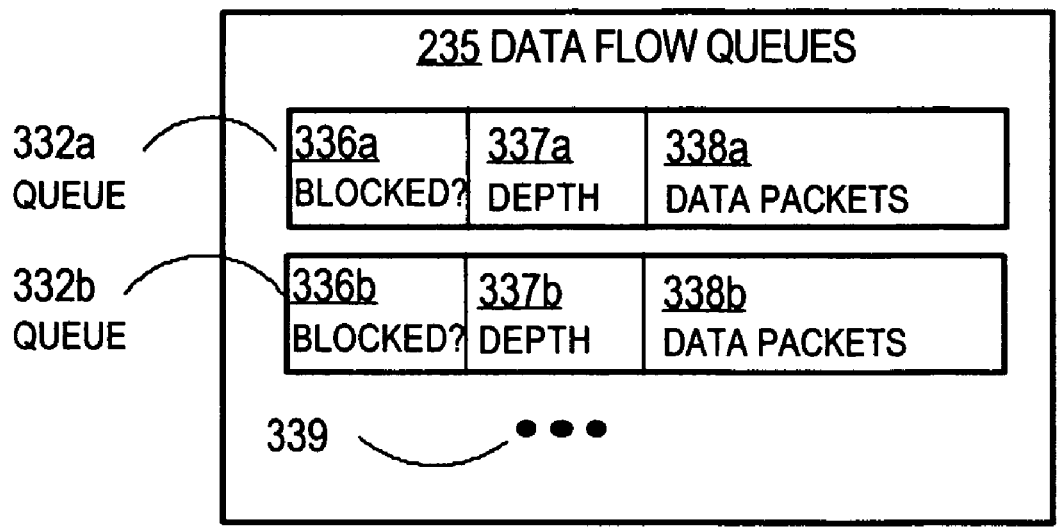
FIG. 3A is a block diagram that illustrates data flow queues, according to an embodiment.

FIG. 3A is a block diagram that illustrates data flow queues 235 in more detail, according to an embodiment. The queues 235 includes multiple queues, including queues 332a, 332b, and other queues indicated by ellipsis 339, collectively referenced as queues 332. In the illustrated embodiment, each queue 332 includes a blocked bit (e.g., 336a, 336b, collectively referenced hereinafter as blocked bits 336), a queue depth field (e.g., 337a, 337b, collectively referenced hereinafter as queue depth field 337), and data packets that share the same flow ID (e.g., 338a, 338b, collectively referenced hereinafter as data packets 337). The blocked bits 336 constitute the blocked queue map 245, described above. One value indicates that the packet data in a queue is directed to a port that is blocked. A different value indicates the data is not directed to a port that is blocked (e.g., the port is not blocked or the data is not yet assigned to a port). Also as described above, in some embodiments, the blocked bits 336 of the blocked queue map 245 are stored separately from the queues 235.

The data packets 338 hold the data packets that are received by the traffic manager 234 from the ASIC 232. The data packets are assigned to a particular queue 332 of the queues 235 using any method known in the art, as described in more detail below. The queue depth field 337 holds a value that indicates the amount of data in the rest of the queue. The amount may be expressed in any units. In an illustrated embodiment, the amount is expressed as a number of data packets. In some embodiments, the amount is expressed as a number of octets. An octet is eight binary digits, i.e., eight bits. The value in the depth field 337 increases as data packets are added to a queue from the ASIC 232. The value in the depth field 337 decreases as data packets are moved to a buffer for the port to which the queue is assigned, as described in more detail below. In some embodiments, the depth fields 337 are stored separately from the queues 235, e.g., in a vector of depth values with one element for each queue 332.

FIG. 3B is a block diagram that illustrates data structures in memory 302 for an egress line card, according to an embodiment. In various embodiments, the data structures described here are stored in one or more memory blocks on the router, including router main memory, memory for the switching system 202, memory for the egress line card 230, and memories for components of the egress line card 230, such as circuit blocks 232, 234, 236, 240.

In the illustrated embodiment, the data structures in memory 302 include the data flow queues 235, port buffers 340, flow control status table 344, and mapping table 350. In other embodiments, other data structures are used to contain data corresponding to the data described here. For example, in some embodiments, some data shown in tables 344 and 350 are spread across multiple different data structures, such as one or more bitmap vectors.

The port buffers 340 include memory space to hold multiple data packets to be sent out through each port. Any type of buffer may be used. In an example embodiment, the buffers are first in first out (FIFO) buffers, well known in the art. In the illustrated embodiment, five port buffers (e.g., 340a, 340b, 340c, 340d, 340e) are shown for the five active ports (port numbers 1 through 5, respectively). Typically, the capacity of each port buffer 340 to hold data packets is small compared to the capacity of each data flow queue 332 to hold data packets 338. The extent to which each of these buffers 340 is filled with data packets to be sent is a measure of the physical state of the corresponding port. For purposes of illustrating the extent to which each port buffer is full, it is assumed that these buffers fill from the bottom. A level that indicates that a port is well used is given by the dotted line 343. A buffer filled to this level or greater is considered to be satisfied. It indicates that the port buffer is almost full and not capable of receiving another complete data packet. A level that indicates that a port is poorly used is given by the dotted line 345. A buffer filled to a level below line 345 is considered to be starving, e.g., without sufficient data to meet minimum performance objectives for the link bundle 130. If the associated buffer does not get data soon, the buffer could empty out and hence underutilize the corresponding link. A buffer filled to a level between line 345 and line 343 is considered to be hungry, e.g., with sufficient data to meet minimum performance objectives for the link bundle 130 but with sufficient room to accept one or more additional data packets. A buffer filled to this level indicates the port buffer has some data but is still "hungry" for more data packets.

For purposes of illustration, it is assumed that these three conditions are identified by a two bit flow control status code that represents the three values from 1 through 3 to correspond to the conditions starving, hungry, satisfied, respectively. (A fourth value, 0, that can be represented by a two bit code is used as a null value to indicate no information, such as for an inactive port.) In the illustrated embodiment, the flow control status codes are stored in the flow control status records 342 of the flow control status table 344, as described in more detail below. In other embodiments, other indications of fill level are used. For example, in some embodiments, the fill level is indicated only by two non-null values, one corresponding to satisfied, the other corresponding to not satisfied (e.g., including both hungry and starving). In an illustrated embodiment, the flow control status table 344 includes five records 342a, 342b, 342c, 342d, 342e, corresponding to the five active ports given by port numbers 1 through 5, respectively.

In some embodiments, the flow control status table 344 is in the same memory block as the port buffers 340. In some embodiments, the flow control status table 344 is in a different memory block. For example, in some embodiments, the port buffers 340 are in a main memory for the router and the flow control status table 344 is on egress line card 230, such as on ports bank 236 or in DLB block 240. In an illustrated embodiment, the port buffers 340 are in the ports bank memory on the egress line card 230. The contents of the flow control status bits are generated by the ports bank memory fill levels and fed directly to a register or small memory for the flow control status records 342 in the DLB 240.

Figure 3C:
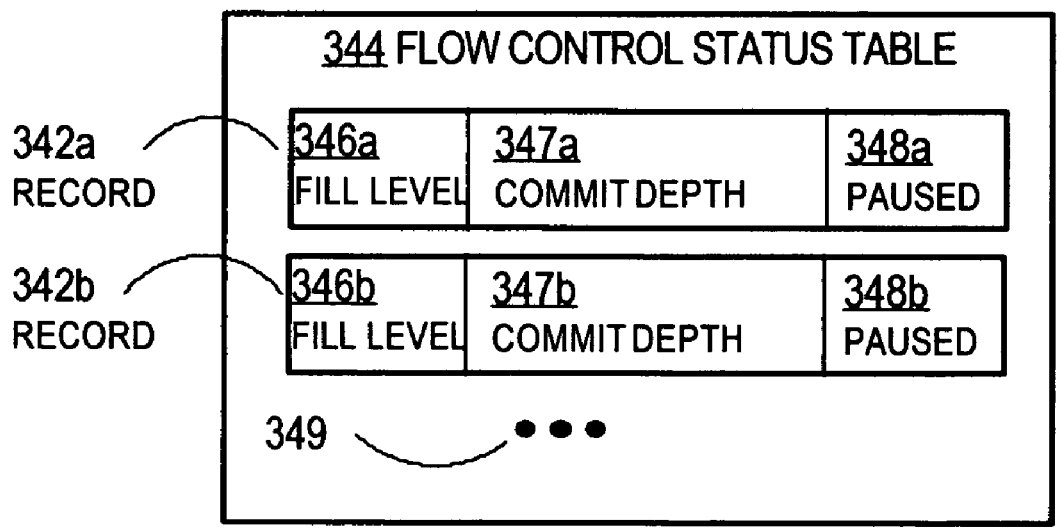
FIG. 3C is a block diagram that illustrates a flow control status table in more detail, according to an embodiment.

FIG. 3C is a block diagram that illustrates a flow control status table 344 in more detail, according to an embodiment.

The table 344 includes multiple records, including record 342a, 342b, and other records indicated by ellipsis 349, collectively referenced as records 342. In the illustrated embodiment, each record 342 includes a fill level field (e.g., 346a, 346b, collectively referenced hereinafter as fill level field 346). A particular fill level value corresponds to a particular flow control status code as described above.

In the illustrated embodiment, each record 342 also includes a commit depth field (e.g., 347a, 347b, collectively referenced hereinafter as commit depth field 347). A particular commit depth value indicates an amount of data in the one or more data flow queues 332 that have been directed to the corresponding port by the port selection process, as is described in more detail below. Any units or granularity in data amount may be used. In some embodiments, the amount of data is expressed as a number of data packets; in some embodiments the amount of data is expressed as a number of octets. For example, if there are 12 data packets in one data flow queue directed to the port #1 and 25 data packets in another data flow queue also directed to the same port, and data packets are the units for expressing amount, then the value in commit depth field 347a for port #1 is 37. The commit depth is a measure of the amount of data expected to be transmitted through the corresponding port; and is independent of the fill level of the port buffer. The commit field is used in some embodiments to determine whether a particular port is under-utilized compared to another port, as described in more detail below. In some embodiments, the commit depth field 247 is omitted.

In the illustrated embodiment, each record 342 also includes a paused field (e.g., 348a, 348b, collectively referenced hereinafter as paused field 348). A particular paused value indicates whether a pause message was received on the corresponding physical link. In some protocols, such as Ethernet, a network node receiving data over a link may indicate to the sending node that the receiving node can not process additional data packets at the present time. In response to receiving the pause message, the sending network node completes sending the current data packet, but does not send another data packet until certain conditions are satisfied. In some embodiments, the condition is the passage of a prescribed amount of time. In some embodiments, the pause message specifies the amount of time. In some embodiments, the condition is receipt of a subsequent message to resume sending data packets. In some embodiments, the paused field 248 is omitted, and the pause option of the protocol is not enabled.

The mapping table 350 includes multiple records, including record 352a, 352b, and other records indicated by ellipsis 353, collectively referenced hereinafter as records 352. In the illustrated embodiment, each record 352 includes a flow identification (flow ID) field (e.g., 354a, 354b, collectively referenced hereinafter as flow ID field 354). A particular flow ID corresponds to a particular stream of related data packets as determined, for example, by examining source or destination fields, or both, in the headers of one or more protocols. Many methods for determining a flow ID are known and practiced in the art. In some embodiments, the flow ID field 354 is omitted, and the position of the record 352 in the mapping table 350 is related to a flow ID. For example, in some embodiments a flow ID is input to a hash function that outputs a particular record number in table 350 that corresponds to the flow ID input to the hash function. Each record 352 in the mapping table 350 corresponds to a queue 332 in the data flow queues 235.

Each record 352 includes a port number (port #) field (e.g., 356a, 356b, collectively referenced hereinafter as port # field 356). The port # field contains data that indicates a particular port on the ports bank, if any, which is used to send data packets for the flow ID associated with the record 352. The value in the port # field indicates the port to which the corresponding queue is assigned.

Each record 352 includes age counter field (e.g., 358a, 358b, collectively referenced hereinafter as age counter field 358). The age counter field contains data that indicates how long since a data packet of the flow ID associated with the record has been sent. In some embodiments, the value in the age counter field 358 increases with time since the last data packet of the flow ID has been sent. In some embodiments, the value in the age counter field 358 decreases with time since the last data packet of the flow ID has been sent.

The mapping table 350 is used in some embodiments in which the sequence of data packets received at the network node connected by the link bundle to the egress line card 230 (e.g., network node 110b connected by link bundle 130 to an egress line card in network node 110c) should be preserved. The use of table 350 to ensure that data packets arrive in correct sequence is described in more detail in the next section.

In some embodiments, neither the sequence is important nor is the choice of a port dependent on the commit depth; so the mapping table can be omitted. For example, in some embodiments, the data packets include a sequence number in an upper layer header that is used to sequence the data packets at a receiving end node. However, in some embodiments, a receiving node, e.g. a router, assumes the data packets are in sequence and detects an error if a data packet arrives out of sequence. The receiving router then instigates error correction traffic that consumes network resources and decreases the performance of the network. Therefore it is desirable in such embodiments to use table 350 and the method described next to ensure data packets arrive at the receiving node in the correct sequence.

The number of records 352 in record table 350, and teh corresponding number of queues 332 in data flow queues 235, is a design choice made at the time an embodiment of the invention is implemented. It is advantageous that the number of records 352 in mapping table 350 be large compared to the number of data flows being directed through a link bundle at one time if a hash function is used. If the number of records is large, then the chances are small that two data flows will be mapped by a hash value to the same record. In an example embodiment, mapping table 350 includes 1024 records 352 and data flow queues 235 includes 1024 queues 332. If multiple data flows are hashed to the same hash value, then those data flows are not distinguished in such embodiments, and are treated as a single data flow.

In some embodiments the mapping table 350 is in the same memory block as the port buffers 340, or flow control status bits 342, or both. In some embodiments, the mapping table is in a different memory block. For example, in some embodiments, the port buffers 340 are on ports bank 236, and both the flow control status table 344 and the mapping table 350 are on DLB block 240. In some embodiments, some fields are stored in different data structures.

Figure 4A:
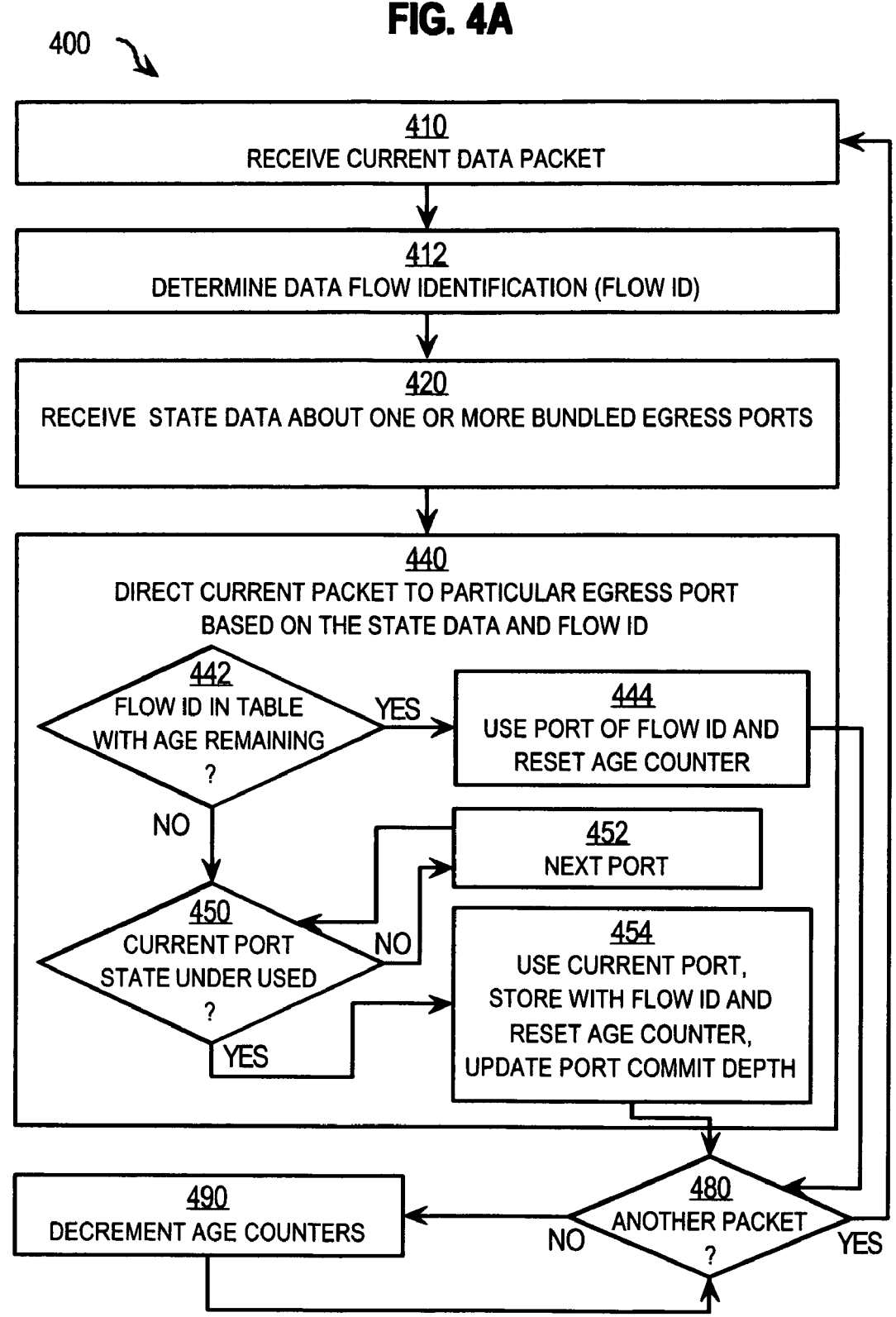
FIG. 4A is a flow diagram that illustrates a method for dynamically balancing traffic load on a link bundle, according to an embodiment.

3.0 Method for Dynamically Balancing Traffic Load 3.1 Method for a Port Selection Process FIG. 4A is a flow diagram that illustrates a method 400 for dynamically balancing data packet traffic load on a link bundle, according to an embodiment. Although steps are shown in FIG. 4A and subsequent flow diagrams 4B and 5 in a particular order for purposes of illustration, in other embodiments one or more steps are performed in a different order or overlapping in time or are omitted, or changed in some combination of ways. For example, in a preferred embodiment shown in FIG. 4B, step 490 to advance age counters is performed in a separate aging process 244 on DLB block 240, and thus overlaps in time any of the other steps depicted in FIG. 4A.

In step 410, a data packet is received. Any method for receiving data may be employed, including receiving the data or its location in memory unsolicited from another component, receiving the data or its location in memory in response to a request sent to another component, or by retrieving the data directly from a known location in memory. For example, the port selection process 242 receives unsolicited from the queue selection process 248, described in more detail below with reference to FIG. 5, the next data packet in the selected queue to be sent out on link bundle 130.

In step 412 a current flow ID is determined for the current data packet. Any method known in the art at the time the method 400 is implemented may be used. In some embodiments, step 412 includes determining and combining the bit values in one or more fields in the header portions of one or more protocols. In some embodiments, step 412 involves receiving the current flow ID from another component, e.g., from switching fabric block 220, or switching ASIC 232 or traffic manager block 234. In some embodiments, the flow ID is the same as the particular queue 332 where the data packet is stored by the traffic manager 234. In some embodiments in which packet sequence within a data flow is not important and commit depth is not used to select ports, step 412 is omitted.

In step 420, state data about one or more of the egress ports in a link bundle is received. Any method for receiving data may be employed, including those described above for step 410. For example, in some embodiments, one or more of the status codes in the flow control status bits 342 are retrieved from a known memory block on ports bark 236. In other embodiments, other kinds of state data that indicate the physical status of one or more egress ports are received. In some embodiments, a status update process 243 stores data in a common area of memory to be retrieved by the port selection process 242. In some embodiments, step 420 is omitted.

In some embodiments, step 420 includes sending to the traffic manager 234 data that indicates flow control status. Any method may be used. For example, data is sent to a register on the traffic manager 234 or to a register on the DLB block 240 that is readable by the traffic manager. In an illustrated embodiment, the flow control status table 344 and mapping table 350 are in an area of memory accessible to the traffic manager 234. In some embodiments, the data sent to the traffic manager includes both a packet flow ID and the flow control status record 342 of the port buffer of the port associated with the packet flow ID. For example, the data sent to the traffic manager includes a hash value of 2 to which the flow ID hashes and the control status fill level equal to 3, which indicates that the port buffer to which this data flow maps is satisfied.

In step 440, the current packet is directed to a particular egress port among the ports bank 236 based, at least in part, on the state data (such as port buffer fill level, commit depth, pause state, or some combination) and the current flow ID. In other embodiments, in which packet sequence is not important, the current packet is directed to a particular egress port among the ports bank 236 based on the state data alone. In still other embodiments that omit step 420, the current packet is directed to a particular egress port based, at least in part, on the current flow ID, and, in particular, on how close in time are two successive packets of the same flow. If the successive packets are far enough apart in time, e.g., farther apart than the greatest delay ever expected on any link in the bundle, then the later packet can be sent through a different port and be sure to arrive after the earlier packet. This preserves the sequence of the data packets received at the other end and still allows multiple ports to be used for the same packet flow. Thus the traffic from a single packet flow can be spread over several links in the bundle, better utilizing the bundle even in the case of traffic dominated by long packet flows.

In the illustrated embodiment, during step 440, the current data packet is directed to a particular egress port based on both the time between two successive packets of the current flow ID and on the state data. Step 440 includes steps 442, 444, 450, 452 and 454.

In step 442, it is determined whether a mapping table (e.g., mapping table 350) already has an entry (e.g., a record 352) for the flow ID of the current data packet with age remaining. Age (e.g., a value stored in the age counter field 358) is an indication of the time that has passed since the most recent data packet of the flow associated with the entry was sent through the port indicated in the entry (e.g., the value in port # field 356). If age remains, as the term is used in step 442, then too little time has passed since the previous packet to allow the current packet to be sent through a different port. As a result, control passes to step 444 to use the same port as used for the previous data packet of the same flow. The use of the terms "age" and "too little" time in an example embodiment are described in more detail below.

Any method may be used to determine the entry in the mapping table associated with the current flow ID. For purposes of illustration, it is assumed that the mapping table 350 includes 1024 records, to distinguish up to 1024 different flow IDs. In some embodiments, such as embodiments using contents addressable memory (CAM), the flow ID determined in step 412 is compared to each entry in table 350 until a match is found. In other embodiments using CAM, the records 352 in mapping table 350 are sorted by flow ID and a binary search is made of the table until the record with the matching flow ID is found. In a preferred embodiment, at least a portion of the flow ID is input to a hash function, which produces a hash value between 0 and 1023. The queue 332 and record 352 at the position of the hash value+1 is then the queue 332 and record 352 associated with the current flow ID. For purposes of illustration, it is assumed that the flow ID of the current data packet hashes to a hash value such that the record 352 at the position of the hash value+1 is record 352*b*.

If the value in the flow ID field 354*b* does not match the current flow ID, then there is no entry for the flow ID in the mapping table 350. This happens, for example, when the first data packet of a particular flow arrives at the DLB block. If there is no entry for the flow ID then the current packet can be directed to any port, such as the next port in a random or round robin port selection process. In the illustrated embodiment, control passes to step 450 to select a port for an underused communication link in the bundle based on state data, as described below.

If there is a value in the flow ID field (e.g., 354*b*) that matches the current flow ID, then a previous data packet of the same flow was sent through the port indicated by the value in the port # field of this record (e.g., 356*b*). In this case, the value in the age counter field (e.g., 358*b*) is checked to determine if there is age remaining.

In some embodiments, the number of records in the mapping table is so large compared to the number of data flows received at one time that there are rarely any "collisions," e.g. multiple different concurrent data flows hashing to the same hash value and therefore to the same record 352. In some of these embodiments, the record number indicated by the hash value is treated as if it belongs to the flow ID of the current data packet, and the flow ID field 354 is omitted from the records 352. Thus, in the example above, record 352*b* is assumed to belong to the flow ID of the current data packet. The flow ID becomes an index into the record table; i.e., the hash value is the address of the record entry. In this case, also, the value in the age counter field (e.g., 358*b*) is checked to determine if there is age remaining. To ensure that no age remains in a record that has not yet been used, the mapping table 350 is initialized with null values for the age counter field 358 or the port # field 356 or both.

In the illustrated embodiment, age remains if the value in the age counter field 358 is greater than zero. In other embodiments, other indications of age are used. For example, in some embodiments, age is remaining if the value in the age counter field is less than some maximum age, or greater than some negative age. The value in the age counter field 358 is managed as described below.

If there is age remaining, then the time between the current data packet and the previous data packet of the same flow ID is too short to ensure that the current packet will arrive after the earlier packet if the current packet is sent through a different port. Thus control passes to step 444 to send the current data packet through the same port as the previous data packet with the same flow ID. That port is indicated by the value in the port # field (e.g., field 356*b*) of the record (e.g., record 352*b*) associated with this flow ID.

If there is no age remaining, then sufficient time has passed, e.g., more time than the worst case computed delay. In this case, the current packet can be directed to any port and be expected to arrive at the next node after the previous data packet, thus preserving the original sequence of data packets. Therefore control passes to step 450 to select the next port.

If it is determined in step 442 that there is age remaining in a record associated with the current flow ID, then control passes to step 444. In step 444, the current data packet is directed to the port indicated by the port number in the record of the current flow ID. For example, the current data packet is placed in the port buffer for the port indicated by the value of the port # field 346*b*.

Also during step 444, the age in the record of the current flow ID is updated to indicate a packet of the current flow ID is being sent at the current time. In the illustrated embodiment, the value in the age counter field 358 is reset to a particular initial value. The value in the age counter field 358 is advanced in time by a background aging process 244, as described below with reference to step 490 and 490*. The particular initial value to which the age counter field 258 is reset is related to the type of advancement in time performed by the aging process during step 490 or 490*.

Also during step 444, the amount of data associated with the current packet (e.g., 1 packet) is decremented from the value in the commit depth field 347 for record 342 of the assigned port. The commit depth is decremented because the queue 332 assigned to that port now holds one fewer packet as that packet is moved to the port buffer for the assigned port.

In some embodiments, advances in time are indicated by a number of clock cycles that are added or subtracted from the value in the age counter field 358. In some embodiments, advances in time are indicated by incrementing or decrementing the value in the age counter field 358 by a fixed amount on each visit to a record of the mapping table 350 by the background aging process 244. In such embodiments, the background process visits each record in the mapping table 350 in turn, and returns to the first record after visiting the last record. The time associated with each visit, and therefore each increment or decrement, depends on the number of records in the table 350, the number of clock cycles programmed for each visit, and the amount of time the background process is swapped out of a processor so that the processor can perform other functions, e.g., to deal with the arrival of a data packet.

In the illustrated embodiment, the value in the age counter field 358 is set to a particular initial value that is related to the worst case computed delay expected on any link in the bundle of links (e.g., a 99.99 percentile delay). In some embodiments, the particular initial value is related to some other property of the link, such as the difference between the maximum delay (e.g., a 99.99 percentile delay) and the minimum delay reasonably expected (e.g., a 0.01 percentile delay). It is assumed for purposes of illustration that the aging process 244 decrements the value in the age counter field 358 by one with each visit to each record in a mapping table 350 with 1024 records. It is further assumed that, based on both programmed cycles and swapped out time, a visit to one record averages about 10 clock cycles. Therefore, successive visits to the same record occur about 10,240 cycles apart (or about 0.1 millisecond apart for a 100 Megahertz clock). It is further assumed for purposes of illustration that the difference between the maximum and minimum delays reasonably expected on a communication link of the link bundle is 4 milliseconds. In this example, the particular initial value is chosen to be about 40 or greater. A value less than, but close to, 40 would experience out-of-order data packets more frequently, but still rarely enough as to be acceptable in some embodiments. In other embodiments, the particular initial value is a performance design choice that can readily be determined by experiment.

In other embodiments, other indications of age and age advancement are used; thus other values are used as the particular initial value. For example, in some embodiments, age is remaining if the value in the age counter field is less than some maximum age (e.g., 40), the aging process increments the value in the age counter field 358 by one on each visit, and the value in the age counter field 358 is reset to a particular initial value equal to zero. In some embodiments, age is remaining if the value in the age counter field is greater than some negative value (e.g., −40), the aging process decrements the value in the age counter field 358 by one on each visit, and the value in the age counter field 358 is reset to a particular initial value also equal to zero.

After step 444 is completed, control passes to step 480, described below. In some embodiments in which out-of-order data packets are not important, steps 442 and 444 are omitted.

If it is determined in step 442 that there is no record 352 in the mapping table 350 associated with the current flow ID, or that there is a record associated with the current flow ID but no age remains (e.g., the value in the age counter field 358 is zero for the illustrated embodiment), then control passes to step 450.

Steps 450, 452, 454 determine a port to use for the current data packet based on the physical states of the ports as reflected in the flow control status table 344. In embodiments in which physical state of the ports is not important (such as in embodiments that assign ports in a random or prescribed order, such as round robin), steps 450 and 452 are replaced by steps that do such an assignment. For purposes of illustration, it is assumed that the five active links have values of flow control status record fields as indicated in Table 1.

TABLE 1

Example active ports and physical states stored in Status table 344.

| Active Port | Port # | Fill Level | Commit Depth | Paused |
|---|---|---|---|---|
| 238b | 1 | 3 (satisfied) | 37 | No |
| 238c | 2 | 3 (satisfied) | 90 | No |
| 238d | 3 | 2 (hungry) | 14 | No |
| 238e | 4 | 2 (hungry) | 11 | Yes |
| 238f | 5 | 1 (starving) | 30 | No |

In step 450 it is determined if the state data associated with a current port indicates that the current port is underused. The first current port may be selected in any manner. For example, in some embodiments, the first current port is selected to be the first active port (e.g., port #1). In some embodiments, the first current port is always a least used port, e.g., one of the starving ports, or the port with the emptiest port buffer.

In step 450, any method may be used to determine that the current port is underused. For example, in some embodiments the current port is underused if the flow control status code for the port is 1, indicating a starving port buffer. In some embodiments, the current port is underused if the flow control status code for the port is 1 or 2, indicating a starving or hungry port buffer. In some embodiments, the current port is NOT underused if the flow control status code for the port is 3, indicating a satisfied port buffer. In some embodiments, the current port is determined to be not underused unless it is the least used of all the active ports. For example, the port selection process 242 uses the port buffer fill level to determine whether or not it should send data to a particular port. The port selection process 242 inspects the fill level fields 346 of all the flow control status records 342 and uses this information to select which port to assign to the unassigned flow. In an illustrated embodiment, the port with the least amount of fill is determined to be the best choice. If the current port is underused, then control passes to step 454 to use that port and update the mapping table. If the current port is not underused, then control passes to step 452.

In some embodiments, step 450 determines that the current port is underused if the port is indicated to be the port with the smallest value in the commit depth field 347. In some of these embodiments, a status update process 243 continually cycles through the records of the flow control status table 344 and updates the contents of the fill level field 346, and determines the one port with the smallest value in the commit depth field 347 at any one time. The port # with the smallest commit depth is reported in a particular register where it is accessed during step 450. For example, using the information in Table 1, port #4 is the underused port to which the next data flow is directed. As various queues are assigned to various ports, the values in the commit depth fields 347 change, and the port with the smallest commit depth changes. The commit depth value for a port buffer is increased whenever a flow queue is assigned to a port. That port's commit depth is the sum of all the packets assigned to that particular port. In the some embodiments, the commit depth is reduced as packets are played out of the flow queues an onto the port buffer. Thus, as the flow queue depth decreases, the commit depth value follows and also decreases. The update of the commit depth occurs when the flow queue update occurs; so decreases ripple to the commit depth from the flow queue. If the flow queue ages out, then the commit depth also gets adjusted, as described below in more detail with reference to step 499 in FIG. 4B. In some embodiments, the value in the commit depth field 347 is decremented as data packets are moved out of the port buffer onto the corresponding port.

In step 452, the next active port is made the current port. Any method may be used to select the next port among the active ports.

For example, using the values in Table 1, and basing the selection purely on fill level, it is determined in step 450 that port #1 is not underused because its control flow status code is 3 (satisfied), so control passes to step 452 to make port #2 the current port. It is determined in step 450 that port #2 is not underused because its control flow status code is also 3 (satisfied), so control passes to step 452 to make port #3 the current port. It is determined in step 450 that port #3 has a control flow status code of 2 (hungry). In embodiments in which a control flow status code of 2 is considered underused, port #3 is considered underused and control passes to step 454 to use port #3. In embodiments in which a control flow status code of 2 is considered NOT underused, control passes to step 452 to make port #4 the current port. The process continues until it is determined in step 450 that port #5 has a control flow status code of 1 (starving), so port #5 is considered underused and control passes to step 454 to use port #5.

In some embodiments, in step 450, the current port is determined to be underused based on comparing control flow status codes for two or more ports. In some such embodiments, the less utilized of two ports is selected. In some such embodiments, a port is not considered among the two compared if the flow control status code is 3 (satisfied). In some embodiments, the current port is determined to be underused if it is the least used among all the active ports, e.g., it is the port with the emptiest port buffer, port #5.

In an example embodiment, step 450 determines that a port with a flow control status code that indicates starving is underused. If no such port is found among all the active ports, then step 450 determines that a port with a flow control status code that indicates hungry is underused. If no such port is found among all the active ports, then step 450 determines that a port with a flow control status code that indicates satisfied is underused. In this embodiment, port #5 is determined to be underused in step 450.

In another example embodiment, step 450 uses the port with the smallest value of commit depth as determined by the background status update process 243. Using the data of Table 1, the status update process 243 determines that the smallest commit depth at the current time belongs to port #4, with 11 data packets in the data flow queues already directed to port 4 and places the port # for this port in a register used during step 450. Port #4, which is merely hungry, could have a smaller commit depth than port #5, which is starving, for example, right after a data flow queue with 30 data packets is directed to port #5. During step 450, the register is read, and the value of port # is determined to be 4. Therefore, port 4 is determined to be underused. In some embodiments, the port with the smallest commit depth that is not paused is determined to be underused. For example, using the information in Table 1, port #3 is determined to be underused because port #4 is paused.

In step 454, the underused port determined in step 450 is used as the port for the current data packet. In the example of Table 1, based purely on fill level, the current data packet of a new flow ID (or of an aged-out extant flow ID) is directed to port #5.

In addition, in step 454, the port # of the current port and particular initial value for the age are stored in association with the flow ID in the mapping table. In the illustrated embodiment, in step 442 the current flow ID had been input to the hash function to obtain a hash value between 0 and 1023 and a record number equal to the hash value+1, which corresponds to record 352b. Thus the contents of record 352b are updated with the port # of the current port and particular initial value for the age. In the examples described above, including Table 1, the current flow ID is stored in the flow ID field 354b, the value 5 is stored in the port # field 356b, and the value 40 is stored in the age counter field 358b. Control then passes to step 480.

Also during step 454, the depth of the current data flow queue is added to the commit depth of the port assigned to data flow of the current data packet. In embodiments without a separate status update process 243 to update the register with the port having the smallest value of the commit depth, the port with the smallest value of commit depth is determined during step 454, after the commit depth for the current port is updated.

In some embodiments in which packet sequence is not important, table 350 is omitted and the port # and particular initial value are not stored in association with the flow ID.

Step 480 represents a branch point in which the DLB block remains until another data packet arrives. When another packet arrives, control passes back up to step 410 to repeat the steps described above. Until another packet arrives, control passes to step 490. In the illustrated embodiment step 490 is performed by the background aging process 244. In some embodiments, step 490 is omitted and the background aging process 244 is a separate state machine and runs independently of method 400.

3.2 Method for an Aging Process

FIG. 4B is a flow diagram that illustrates a separate background aging process 490*, according to an embodiment. In step 490* of FIG. 4B, the age counters stored in the age counter fields 358 of the mapping table 350 are advanced. In step 491, as described above, each of the 1024 records in mapping table 350 are visited in turn. In step 493 it is first determined whether age remains in the age field 358 of a record 352. If there is no age, e.g., if the content of the age field 358 is null, then nothing further is done and control passes back to step 491 to step to the next record in the mapping table. If there is age remaining, then control passes to step 495 to advance the age. For example, the contents of the age field are decremented by one.

In the example described further above, every 0.1 milliseconds or so, 1 is subtracted from each of the counts used as age values in the age counter field 358; thus after 1 millisecond or so, the count in the age counter field 358b is down to 30.

When decrementing the count in age counter field 358 for a record results in a value of zero, the flow ID associated with that record has aged out, according to the illustrated embodiment. In other embodiments, a different value indicates the record has aged out. For example, in embodiments in which the particular initial value is zero, the record ages out at a negative number (e.g., −40) related to the longest reasonable delay. In embodiments in which step 490 advances the age counters by incrementing a value that is initialized at zero, the record ages out when the value attains the value (e.g., +40) related to the longest reasonable delay.

In step 497 it is again determined whether age remains in the age field 358 of a record 352, i.e., it is determined whether the record has aged out. If not, control passes back to step 491 to step to the next record in the mapping table. If it is determined that the record has aged out control passes to step 499. When a record ages out, enough time has passed that the next data packet for the same flow may be sent out on another link of the link bundle with the practical assurance that it will not arrive before the data packet that most recently reset the age counter field to the particular initial value. In some embodiments, the value in the age counter field 358 is not decremented below zero. In the illustrated embodiment, when the value of the age counter field 358 reaches zero as determined in step 497, control passes to step 499. In step 499, the values in the flow ID field 354 and the port # field 356 and the age field 358 are reset to null values that indicate no flow ID or port # or age is now associated with the record (and teh corresponding queue 332). In other embodiments, one or more of these fields are not set to null values. For example, in embodiments without an explicit flow ID field 354, the flow ID field 354 is not set to a null value. During step 499, the commit depth field for the port that was indicated by data in the port # field is decremented by the depth of the queue that is associated with the current record in the mapping table. That queue is no longer committed to that port, so the commit depth in the flow control status record is reduced by the amount of data in that queue.

Using the steps of method 400 and 490* in some embodiments, data packets are distributed to ports that are not satisfied before being directed to ports that are satisfied and thus heavily utilized. In other illustrated embodiments, data packets are distributed to ports that have the smallest commit depth, such as port #4 before being assigned to other ports. Data packets from a single data flow are directed to use the same port, no matter how heavily utilized, until a gap in data packets occurs that is long enough to send the later packets on less busy ports without having the packets arrive out of order at the other end of the link bundle.

In other embodiments other data structures are used as mapping table 350, or to represent the physical state of the active ports connected to the link bundle. In other embodiments other choices are made for the particular initial value of a timing field that corresponds to the age counter field used in the illustrated embodiment. In other embodiments, other methods are used to determine which port to use based on either the state or the gap in time between data packets of the same flow.

3.3 Method for a Queue Selection Process

As described above, the port selection process directs a data packet to a particular port. The port selection process does not determine the data packet that it receives; but reacts to the data packet sent. The selection of the next data packet is a function of the traffic manager. In some embodiments, the DLB block includes a queue selection process 248 in the traffic manager 234 to determine which data flow queue should be the source of the next data packet directed to a port.

In some embodiments, the traffic manager 234 determines not to send data packets from data flow queues that are directed to ports that are not suited to accepting more data at the current time. For example, in some embodiments DLB block 240 is included in traffic manager 234, so that traffic manager 234 has access to flow control status table 344. A queue selection process 248 in the traffic manager determines not to send any further data packets from flows directed to satisfied port buffers, until those status bits change to reflect a hungry or starving port buffer. This process is described further in FIG. 5.

FIG. 5 is a flow diagram that illustrates a queue selection process 500 in a traffic manager of an egress line card, according to an embodiment. Prior to step 510, data is received for a packet flow, and placed in the data packets field 338 of a data flow queue 332 of the data flow queues 235, as in a standard traffic manager. In the illustrated embodiment, a data queue exists in queues 235 for each flow ID. In some embodiments, the flow ID is one of a particular number of hash values, as described above. The data packet is placed in the queue associated with the flow ID of the packet. Processing continues at step 510.

In step 510 state data is received that indicates a blocked data flow. Any method may be used to indicate the blocked data flow. For example, in some embodiments, data indicating a flow ID and flow control status records for the associated buffer are sent by the port selection process 242 during step 420 and received during step 510. In some embodiments, data indicating the flow ID hash value is received instead of data indicating the flow ID. In the illustrated embodiment, data is retrieved from the mapping table 350 and flow control status table 344 during 510.

In an illustrated embodiment, step 510 includes steps 512, 514, 516 and 518. In other embodiments, one or more of steps 512, 514, 516, 518 are omitted. In step 512 data is received that associates data flows with one or more egress ports in the bundle. For example, the traffic manager 234 reads the mapping table 350. In step 514, data is received that indicates the flow control status records for one or more of the port buffers. For example, the traffic manager 234 reads the fill level field 346 in one or more of the flow control status records 342 in the flow control status table 344.

In step 516, state data is received that indicates the most favorable egress port. For example, the queue selection process 248 reads the register where is stored the port # of the port with the smallest value of commit depth. In the embodiment using Table 1, port #4 is the most favorable egress port for a new data flow queue.

In step 516, state data is received that indicates a pause message (such as an Ethernet pause frame) has been received on one or more egress ports. For example, the traffic manager 234 reads the paused field 348 in one or more of the flow control status records 342 in the flow control status table 344. In the embodiment using Table 1, port #4 is the most favorable egress port for a new data flow queue, but is determined to be in a paused state based on the contents of the paused data field 348.

In step 530, a data flow is determined to be blocked based on the data received during step 510. For example, it is determined that all flow IDs that hash to a hash value of 1 or 2 are blocked, because the flow control status bits associated with the hash values of 1 and 2 indicate the associated port buffers are satisfied. In some embodiments, step 530 includes determining a data flow directed to the most underused port as the unblocked data flow.

In step 540, the traffic manager 234 sends a data packet from a data queue for a flow ID that does not hash to the hash value of a heavily used link, e.g., hash values 1 and 2. For example, the traffic manager 234 sends a data packet from a queue for a flow ID that hashes to the values 3, 4 or 5. If no packet data resides in the data queue for these flow ID's, then no packet is sent and processing continues at step 510. The flow control status bits associated with these hash values indicate the associated port buffers are hungry or starving, as shown in Table 1. In some embodiments, the traffic manager 234 sends a data packet from a queue for a flow ID that hashes to the value 5 because the flow control status bits associated with hash value 5 indicate the associated port buffer is starving. If no packet data resides in the data queue for flow ID hashed to value 5, then a packet may be chosen for flow IDs that hash to values 3 or 4 (whose associated port buffers are hungry).

In some embodiments, during step 530, a blocked queue map 245 is generated based on the contents of the flow control status table 344 and the mapping table 350. The blocked queue map 245 is contained in the data flow queues 235 in the illustrated embodiment. In some embodiments, the blocked queue map 245 is stored elsewhere. If either the fill level field, or the paused field indicates that a port associated with a data flow queue in the mapping table 350 is not suited to accept additional data packets, then a bit in the associated blocked queue map 245 is set to indicate a blocked queue. In some embodiments, the bits in the blocked queue map are set by the status update process 243. Any data flow queue that is not yet associated with a port in the mapping table 350, has its blocked queue map 245 bits set according to fill level and paused fields for the port with the smallest value of the commit depth. This is done because the port with the smallest value of commit depth is the port that the data flow queue would be directed to, if sent. In the embodiment using Table 1, it is determined that ports #1 and #2 and #4 are blocked. The fill level is satisfied for port #1 and #2, and port #4 is paused.

During step 540, in these embodiments, a data flow queue is selected that is not blocked, based on the blocked queue map 245. The next data packet in the selected data flow queue is then sent for processing by the port selection process 242. In the embodiment using Table 1, it is determined that the next data packet should be sent from a data flow queue directed to port #3 or #5. It is assumed for purposes of illustration that a data flow queue having a hash value directed to record 352a is associated with port #3 in mapping table 350. Therefore the next data packet in this data flow is sent to the port selection process 242.

In the illustrated embodiment, the traffic manager receives flow control information for the port FIFO buffers to avoid sending packets toward a full or paused port buffer. In the illustrated embodiment, the traffic manager 234 has a queue 332 (data bucket) for each hash result (record 352 in the map table). The traffic manager 234 makes a queue selection knowing which queue maps to which port based on the data received in step 510 and the state of those ports. This is desirable to avoid a blocking situation in which the traffic manager 234 tries to send a packet to the ports bank when the associated port is not suitable for accepting more data, such as when the port buffer is full, or the port has received a pause message.

4.0 Implementation Mechanisms—Hardware Overview

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632a and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software.

The signals transmitted over network link 632 and other networks through communications interfaces such as interface 670, which carry information to and from computer system 600, are exemplary forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632b through communications interface in switching system 630. The received code may be executed by processor 602 or switching system 630 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632b. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for distributing data packets over a bundle of communication links between two network devices, the method comprising:

receiving first commitment data that indicates an amount of data in a data flow queue directed to a buffer for a port of a plurality of active egress ports connected to a bundle of communication links with one particular network device, wherein:
  a plurality of buffers for the plurality of active egress ports are different from a plurality of data flow queues that include the data flow queue; and
  a plurality of data packets in such data flow queue are to be received at the particular network device in a same sequence as stored in the data flow queue;
determining a particular buffer of the plurality of buffers for a particular data flow queue that is not already directed to any buffer of the plurality of buffers based at least in part on the first commitment data; and
directing a particular output data packet, from the particular data flow queue that is not already directed to any buffer, to the particular buffer.

2. The method as recited in claim 1, further comprising:
receiving particular size data that indicates an amount of data in the particular data flow queue; and
storing second commitment data that indicates the amount of data in the particular data flow queue directed to the particular buffer based on the particular size data.

3. The method as recited in claim 1, wherein said determining the particular buffer further comprises determining that an amount of data already directed to the particular buffer is no greater than an amount of data already directed to any other buffer.

4. A method for distributing data packets over a bundle of communication links between two network devices, the method comprising:

receiving in an output data queue a current data packet based on a data packet received at an ingress port;
receiving state data that indicates a physical state of a first port buffer of a plurality of port buffers for active egress ports connected to the bundle of communication links with one particular network device other than a fill level for the first port buffer;
wherein the plurality of port buffers for the plurality of active egress ports is different from a plurality of output data queues that include the output data queue;
determining whether the state data indicates the first port buffer is unsuitable for receiving additional data; and
if it is determined that the state data indicates the first port buffer is unsuitable for receiving the additional data, then directing the queued current data packet to a second different port buffer of the plurality of port buffers for the active egress ports.

5. The method as recited in claim 4, wherein said state data indicates whether a pause message has been received at a port corresponding to the first port buffer, wherein the pause message includes data that indicates that the particular network device is not ready to accept another data packet.

6. An apparatus for distributing data packets over a bundle of communication links between two network devices, the apparatus comprising:

means for receiving first commitment data that indicates an amount of data in a data flow queue directed to a buffer for a port of a plurality of active egress ports connected to the bundle of communication links with one particular network device, wherein:
  a plurality of buffers for the plurality of active egress ports is different from a plurality of data flow queues that include the data flow queue; and
  a plurality of data packets in such data flow queue are to be received at the particular network device in a same sequence as stored in the data flow queue;
means for receiving an output data packet from a particular data flow queue that is not directed to any buffer of the plurality of buffers;
means for determining a particular buffer based at least in part on the first commitment data; and
means for directing the output data packet to the particular buffer.

7. An apparatus for distributing data packets over a bundle of communication links between two network devices, the apparatus comprising:

an ingress network interface that is coupled to a network for receiving from the network an inbound data packet;
an egress network interface that includes a plurality of active egress ports coupled to the bundle of communication links with one particular network device for sending a current data packet to that particular device;
a plurality of output data flow queues;
a plurality of buffers for the plurality of active egress ports, wherein the output data flow queues are different than the buffers;
a computer-readable medium for storing information;
one or more processors; and
one or more sequences of instructions stored on the computer-readable medium, which, when executed by the one or more processors, results in:
  storing an output data packet in a data flow queue of the plurality of output data flow queues based on a flow identification associated with the output data packet, wherein:
    the output data packet is based on the inbound data packet; and
    the flow identification indicates a set of one or more data packets including the output data packet that are to be sent in a same sequence as received on the ingress network interface;
  receiving state data that indicates a physical status of a first buffer of the plurality of buffers;
  determining a particular output data flow queue based at least in part on the state data; and
  directing a next data packet from the particular output data flow queue to a second different buffer of the plurality of buffers.

8. The apparatus as recited in claim 7, wherein said receiving state data further comprises receiving state data that indicates a physical status of a first plurality of buffers, wherein the first plurality of buffers includes the first buffer.

9. The apparatus as recited in claim 7, wherein:
said receiving state data further comprises receiving state data that indicates the first buffer is too full to accept another data packet; and
said determining the particular output data flow queue further comprises determining an output data flow queue that is not directed to the first buffer.

10. The apparatus as recited in claim 7, wherein:
said receiving state data further comprises receiving state data that indicates a pause message has been received at a port corresponding to the first buffer from the particular network device;
wherein the pause message includes data that indicates that the particular network device is not ready to accept another data packet; and
wherein said determining the particular output data flow queue further comprises determining an output data flow queue that is not directed to the first buffer.

11. The apparatus as recited in claim 10, wherein said receiving state data that indicates the pause message has been received further comprises receiving state data that indicates the pause message has been received within a time interval during which the pause message is effective.

12. An apparatus for distributing data packets over a bundle of communication links between two network devices, the apparatus comprising:
an ingress network interface that is coupled to a network for receiving from the network an inbound data packet;
an egress network interface that includes a plurality of active egress ports coupled to the bundle of communication links with one particular network device for sending a current data packet to that particular device;
a computer-readable medium for storing information;
one or more processors; and
one or more sequences of instructions stored on the computer-readable medium, which, when executed by the one or more processors, results in:
receiving first commitment data that indicates an amount of data in a data flow queue directed to a buffer for a port of the plurality of active egress ports, wherein:
a plurality of buffers for the plurality of active egress ports is different from a plurality of data flow queues that include the data flow queue; and
a plurality of data packets in such data flow queue are to be received at the particular network device in a same sequence as stored in the data flow queue;
receiving an output data packet from a particular data flow queue that is not directed to any buffer of the plurality of buffers;
determining a particular buffer for a data flow queue that is not already directed to any buffer of the plurality of buffers based at least in part on the first commitment data; and
directing a particular output data packet from the data flow queue that is not already directed to any buffer to the particular buffer.

13. The apparatus as recited in claim 12, wherein execution of the one or more sequences of instructions results in:
receiving particular size data that indicates an amount of data in the particular data flow queue; and
storing second commitment data that indicates an amount of data in the particular data flow queue directed to the particular buffer based on the particular size data.

14. The apparatus as recited in claim 12, wherein said determining the particular buffer further comprises determining that an amount of data already directed to the particular buffer is no greater than an amount of data already directed to any other buffer.

15. An apparatus for distributing data packets over a bundle of communication links between two network devices, the apparatus comprising:
an ingress network interface that is coupled to a network for receiving from the network an inbound data packet, the ingress network interface associated with a plurality of data flow queues;
an egress network interface that includes a plurality of active egress ports coupled to the bundle of communication links with one particular network device for sending a current data packet to that particular device, wherein each egress port is associated with a buffer, wherein the associated buffers are different than the data flow queues;
a computer-readable medium for storing information;
one or more processors; and
one or more sequences of instructions stored on the computer-readable medium, which, when executed by the one or more processors, results in:
receiving the current data packet based on the inbound data packet in the data flow queues;
receiving state data that indicates a physical state of a first buffer of the plurality of buffers other than a fill level for the first buffer;
determining whether the state data indicates the first buffer is unsuitable for receiving additional data; and
if it is determined that the state data indicates the first buffer is unsuitable for receiving the additional data, then directing the current data packet stored in the data flow queues to a second different buffer of the plurality of buffers.

16. The apparatus as recited in claim 15, wherein said state data indicates whether a pause message has been received at a port corresponding to the first buffer, wherein the pause message includes data that indicates that the particular network device is not ready to accept another data packet.

* * * * *

UNITED STATES PATENT AND TRADEMARK OFFICE
CERTIFICATE OF CORRECTION

PATENT NO. : 7,623,455 B2 Page 1 of 1
APPLICATION NO. : 11/097798
DATED : November 24, 2009
INVENTOR(S) : Hilla et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1102 days.

Signed and Sealed this

Fourteenth Day of December, 2010

David J. Kappos
*Director of the United States Patent and Trademark Office*